Figure 10:
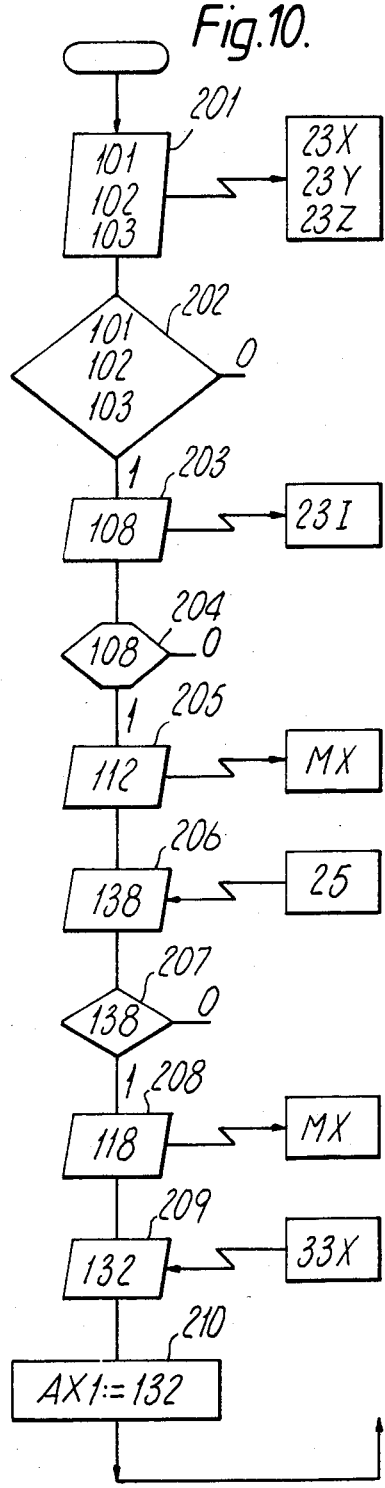

United States Patent [19]
McMurtry

[11] Patent Number: 4,542,467
[45] Date of Patent: Sep. 17, 1985

[54] METHOD OF OPERATING A MACHINE TOOL WITH A SENSING PROBE IN ORDER TO GATHER POSITIONAL DATA FOR THE CALCULATION OF TOOL OFFSET PARAMETERS

[75] Inventor: David R. McMurtry, Wotton-under-Edge, England

[73] Assignee: Renishaw Electrical Limited, Wotton-under-Edge, England

[21] Appl. No.: 421,491

[22] Filed: Sep. 16, 1982

[51] Int. Cl.$^4$ ............................................. G06F 15/46
[52] U.S. Cl. .................................. 364/474; 364/167; 364/551
[58] Field of Search ............... 364/474, 475, 167, 560, 364/550, 551, 170, 174; 318/572; 33/174 L, 174 P, 174 PC

[56] References Cited

U.S. PATENT DOCUMENTS

| | | | |
|---|---|---|---|
| 4,030,201 | 6/1977 | Possati et al. | 364/560 |
| 4,281,385 | 7/1981 | Nakaso et al. | 364/170 |
| 4,357,664 | 11/1982 | Imazeki et al. | 364/474 |
| 4,382,215 | 5/1983 | Barlow et al. | 318/572 |
| 4,428,055 | 1/1984 | Kelley et al. | 364/474 |
| 4,437,151 | 3/1984 | Hurt et al. | 364/474 |

FOREIGN PATENT DOCUMENTS

| | | |
|---|---|---|
| 1244624 | 8/1971 | United Kingdom . |
| 1358913 | 7/1974 | United Kingdom . |
| 2083658 | 3/1982 | United Kingdom . |

*Primary Examiner*—Jerry Smith
*Assistant Examiner*—Louis Woo
*Attorney, Agent, or Firm*—Spencer & Frank

[57] ABSTRACT

The machine tool is a machining center having an angularly positionable tool spindle, a work table movable relative to the spindle, and a surface-sensing probe mountable on the spindle for measuring dimensions or positions on a work piece situated on the table. The probe senses a surface when the latter lies a small distance ("the probe offset") away from the spindle axis.

The method comprises providing on the workpiece a bore 24 defining opposite test surfaces $-DX$ and $+DX$. The mid-point between the test surfaces has a known nominal position but an unknown actual position. The method further comprises operating the machine in a specified way to measure the test surfaces, the operation including rotating the spindle through 180° between certain of the measuring operations. The measurements are then used for computing the probe offsets and the distance ("the work offset") between said nominal and actual positions.

1 Claim, 13 Drawing Figures

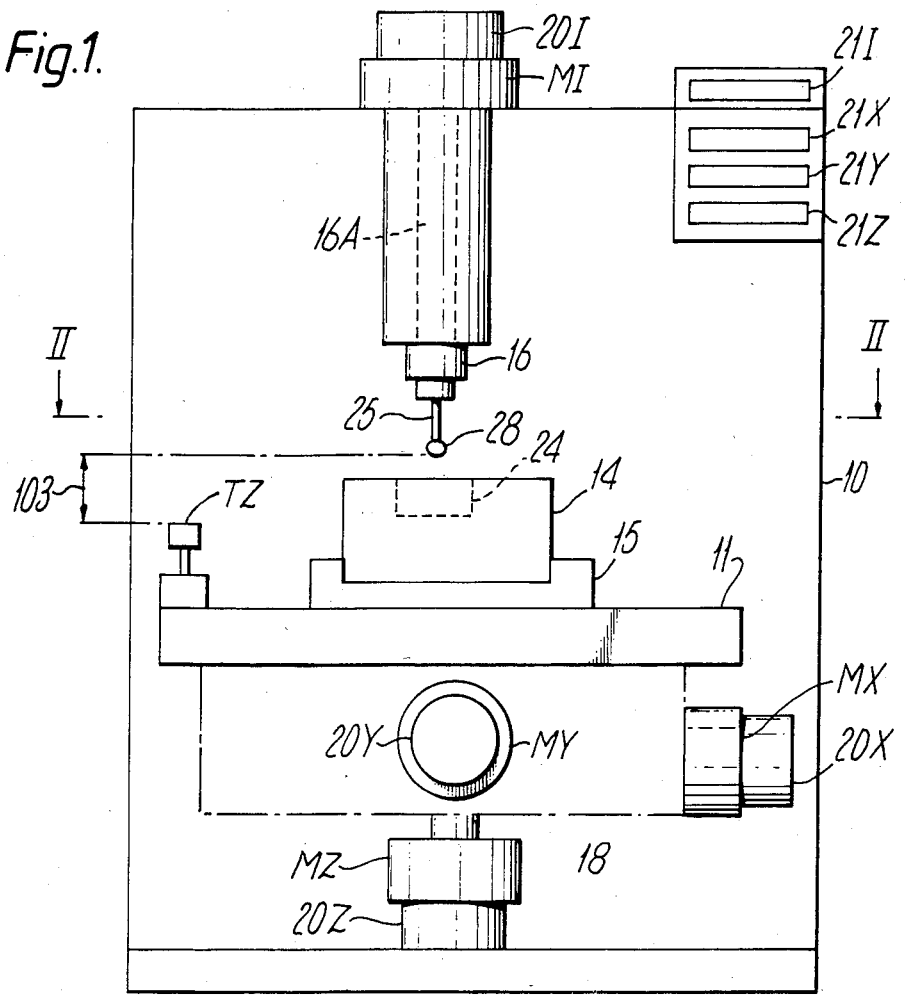
Fig.1.
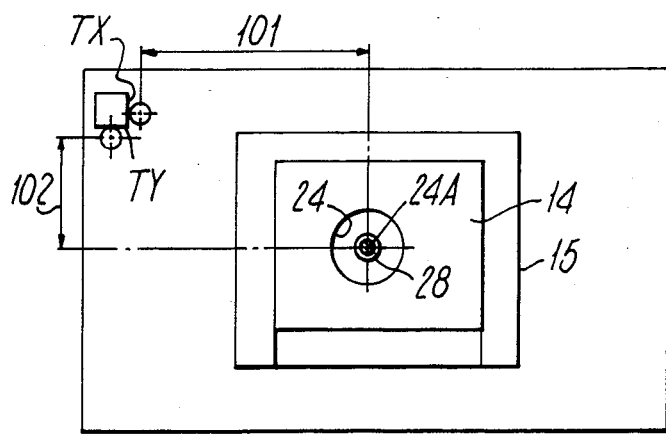
Fig.2.
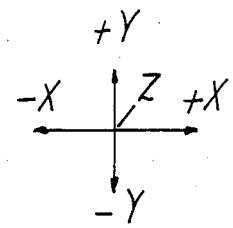

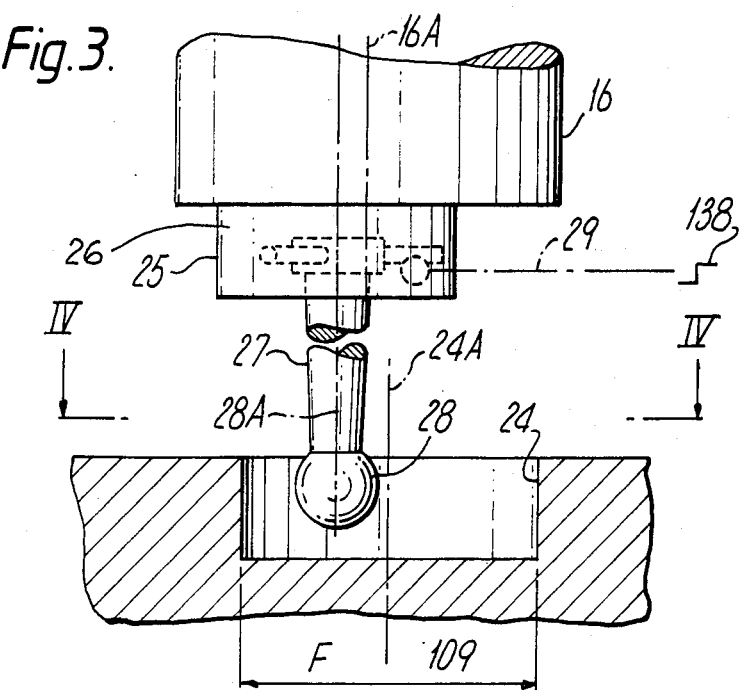
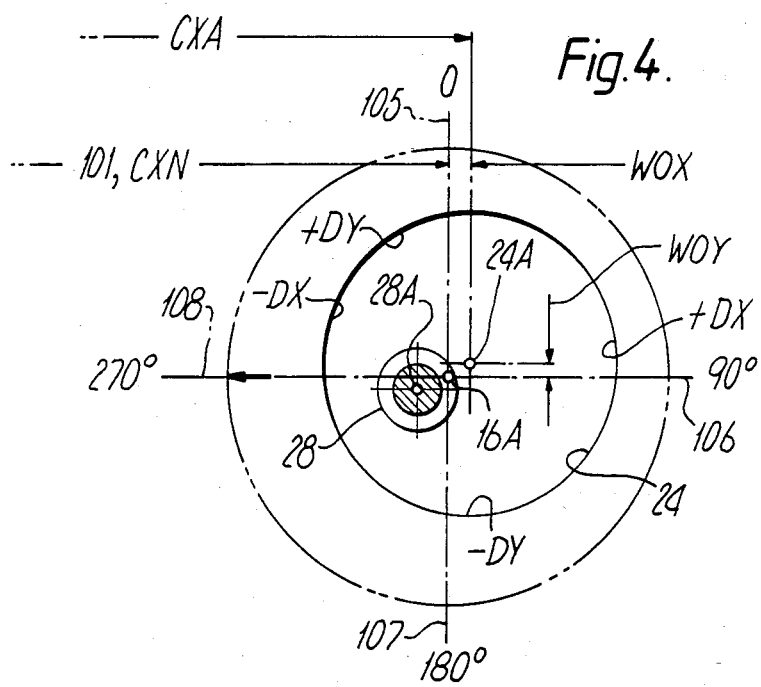

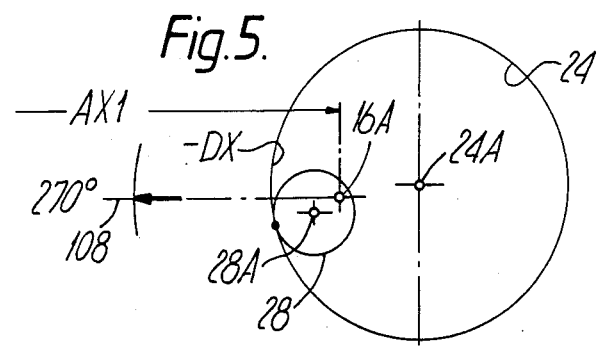
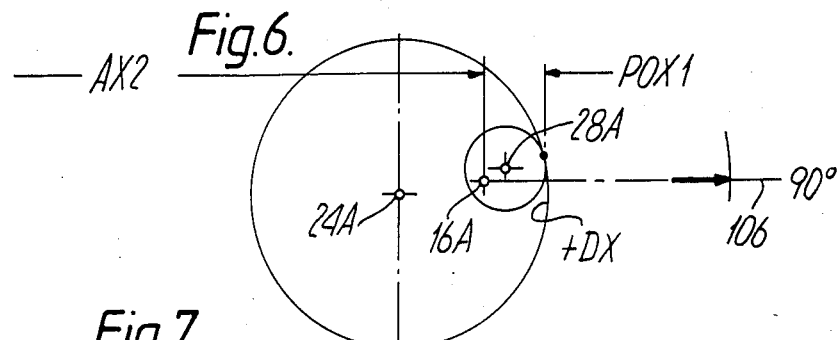
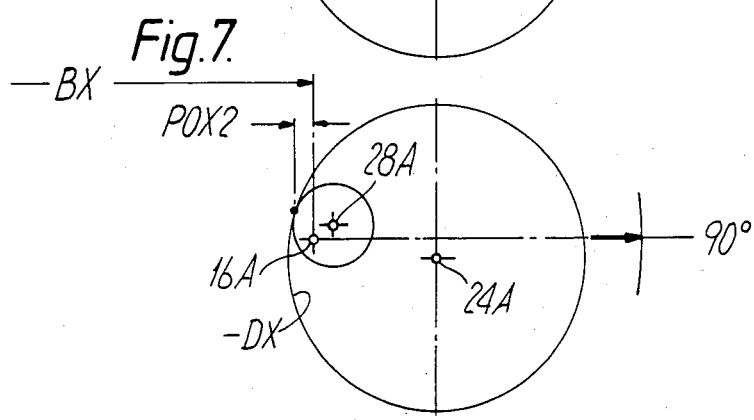
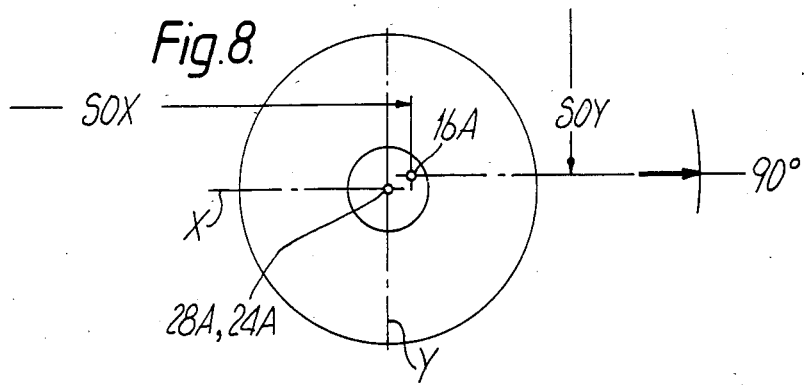

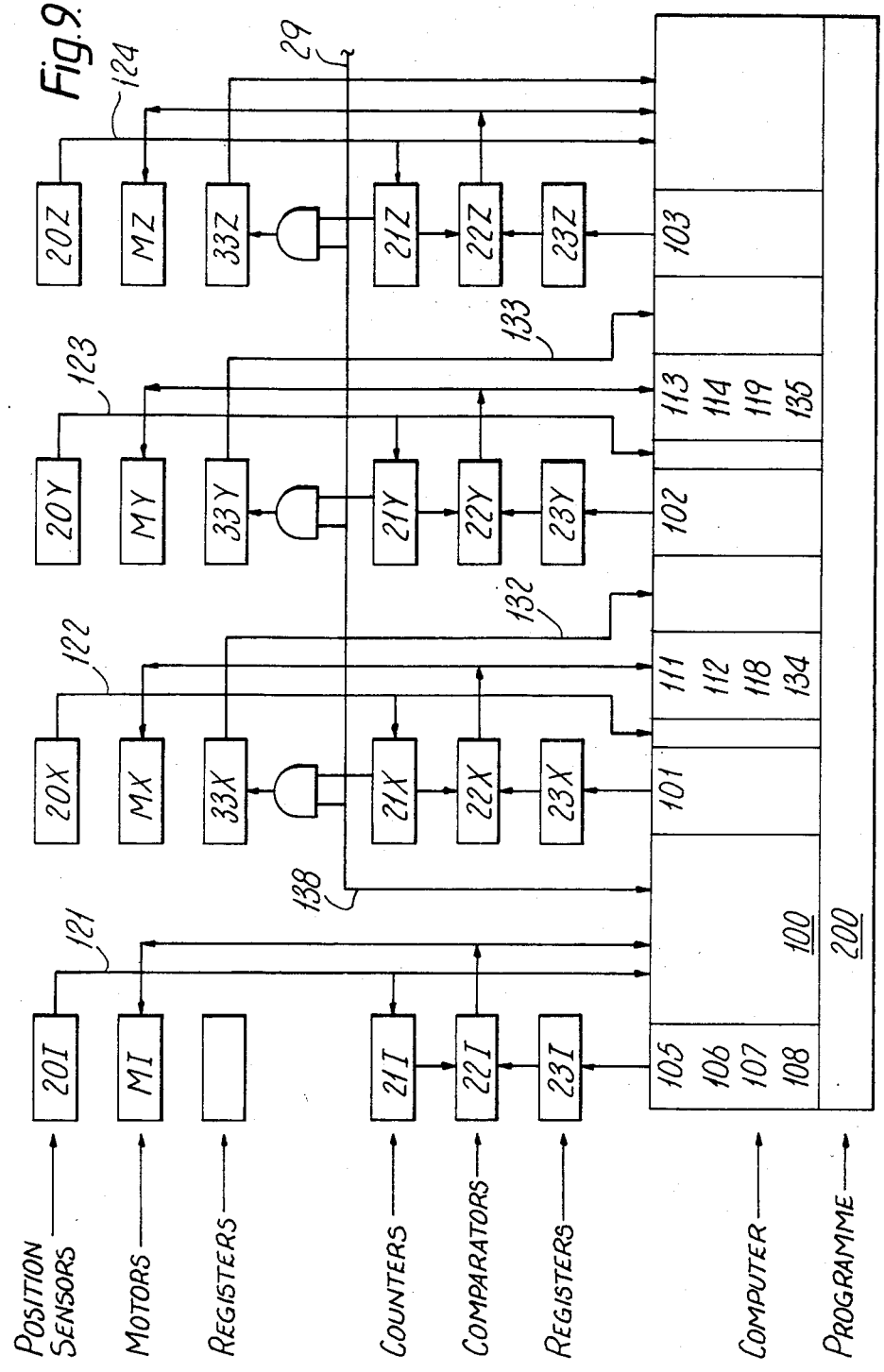

Fig. 10b. Fig. 10c.
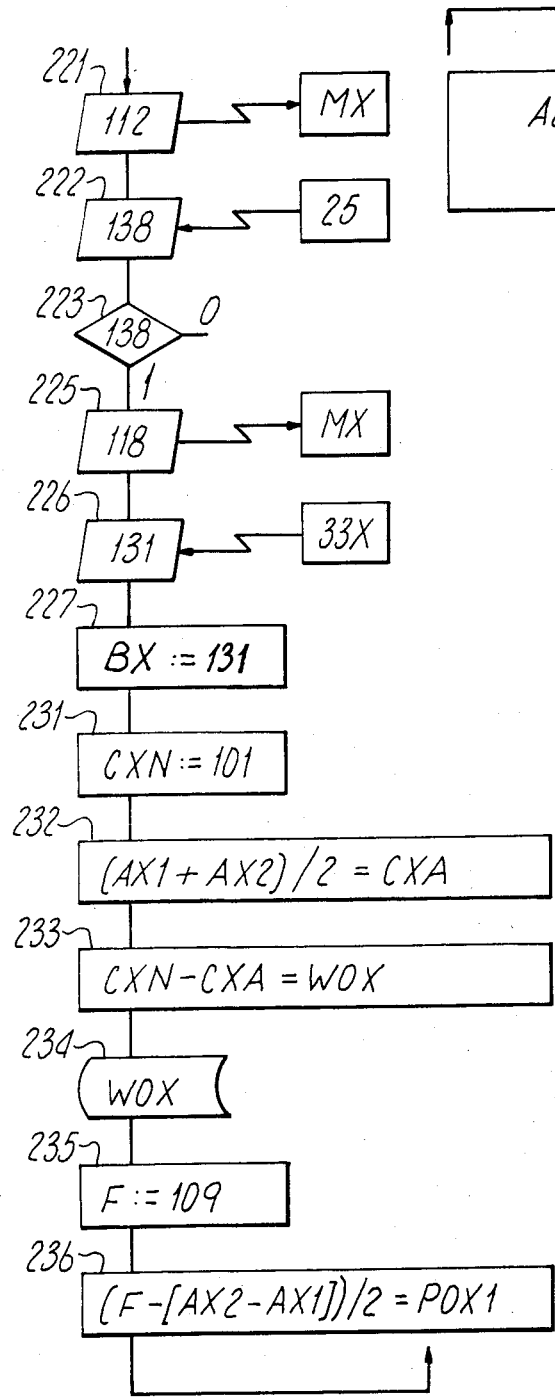
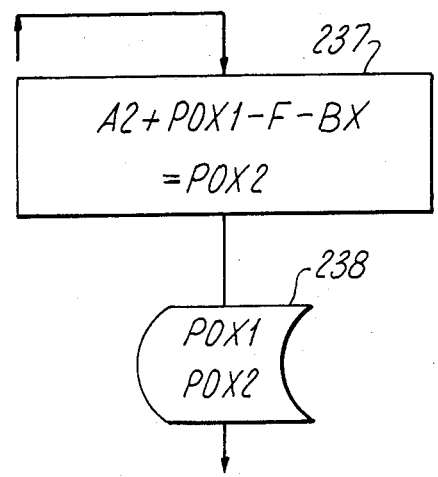

METHOD OF OPERATING A MACHINE TOOL WITH A SENSING PROBE IN ORDER TO GATHER POSITIONAL DATA FOR THE CALCULATION OF TOOL OFFSET PARAMETERS

This invention relates to a method of operating a machine tool of the kind comprising a tool spindle having an axis of rotation, means for rotating the spindle through predetermined angles of rotation, a table movable relative to the spindle transversely to said axis, a surface-sensing probe mounted on the spindle, means for outputting a probe signal at an instant of said probe being brought into a sensing relationship with a surface defined on said table, means responsive to the occurrence of a said probe signal for producing an output corresponding to the position of said axis relative to a primary datum which is fixed in relation to the table and a computer connected to read said output.

The probe is usually stored in a tool magazine in the same way as the rotary cutting tools to be used in the machine. The probe may be mounted on the spindle by an automatic tool change mechanism when required for a measuring operation. Measuring operations are needed before machining to determine the position of a surface to be machined and after machining to check the dimensions of the machined surface.

The probe senses the surface at a point which lies a small distance away from the spindle axis. This distance is referred to as the probe offset and has to be taken into account during measuring operations. Offsets are not uniform in all directions around said axis. This is partly due to characteristics of the probe itself and may also be due to unavoidable misalignment between the probe and the spindle. Therefore, when the probe has been mounted on the spindle, it is desirable to calibrate the probe in the sense of determining the offsets in selected directions around said axis so that during subsequent measuring of differently orientated surfaces, the different offsets are available for being appropriately taken into account, the spindle itself not being rotated for the purpose of measuring such differently orientated surfaces. It is an object of this invention to provide an automatically operable method of determining the different offsets of the probe in a machine of the kind described.

The invention as claimed herein involves providing test surfaces on the table on or adjacent to the workpiece, operating the machine in a specified way to measure the test surfaces, the operation including rotating the spindle between certain of the measurements, and finally using the measurements for certain computations whereby the probe offsets are determined.

It is known to determine only a single offset and, during measuring operations at differently orientated surfaces, rotate the spindle with the intention of ensuring that the offset is always perpendicular to the surface to be measured. This has certain disadvantages in that it can lead to inaccuracies especially when measuring bores.

Figure 10A:
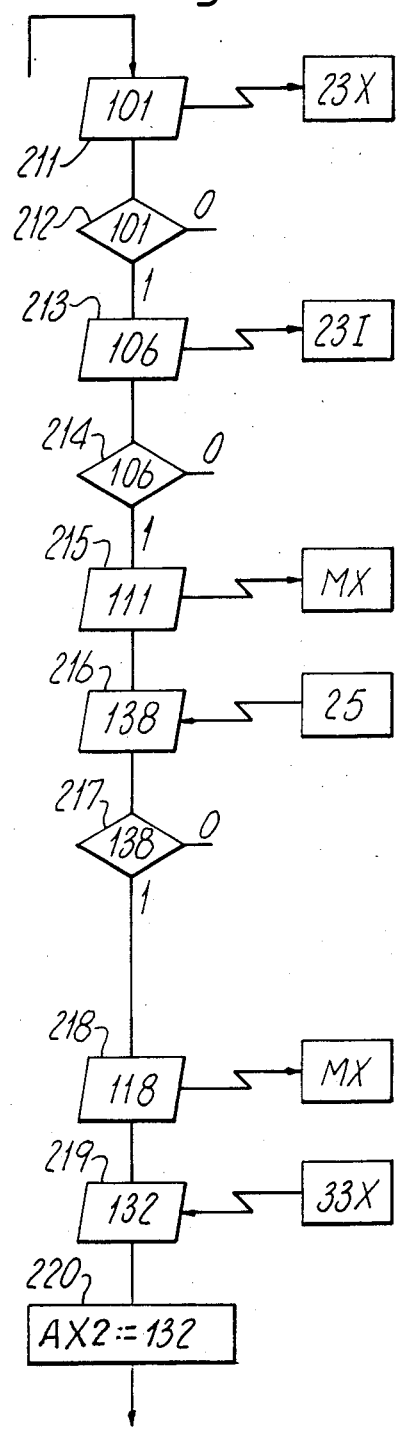

An example of the method according to this invention will now be described with reference to the accompanying drawings wherein:

FIG. 1 is an elevation of a machine tool,
FIG. 2 is a section on the line II—II in FIG. 1,
FIG. 3 is an enlarged detail of FIG. 1,
FIG. 4 is a section on the line IV—IV in FIG. 3,
FIGS. 5 to 8 show different operational positions of the detail shown in FIG. 4,
FIG. 9 is a system diagram,
FIG. 10 is a flow diagram continued in FIGS. 10a to 10c.

Referring to FIGS. 1 and 2 the machine tool, being a machining centre, comprises a fixed structure or base 10, a work support or table 11 adapted by means of a fixture 15 to support a workpiece 14 in a predetermined datum position thereon. The machine includes a tool support being a spindle 16 supported on the base 10 for continuous rotation about a fixed axis 16a as well as for being indexed about that axis between given angular positions by stepper motor MI having a position sensor 20I whose output is connected to a digital counter 21I. The table 11 is supported on the base 10 by a slide system 18 for linear movements in directions X,Y,Z of the rectangular coordinate system. The movements in the respective directions are effected by motors MX, MY, MZ and are continually measurable relative to the base 10 by position sensors 20X, 20Y, 20Z outputs to digital counters 21X, 21Y, 21Z. Each counter 21 has an output to a respective comparator 22 (FIG. 9) supplied with demand data by a register 23. Each motor M is drivable to a demanded position by a closed loop whose error signal is the difference between the contents of the relevant counter 21 and register 23.

The workpiece 14 has a datum bore 24 having an axis 24A defining the workpiece datum in the X,Y directions. The datum position of the workpiece 14 on the table 11 is defined by distances 101, 102, 103 between the axis 24A and table datum surfaces TX, TY, TZ. However, since machining operations are carried out by rotary cutting tools (not shown) mounted on the spindle 16 concentric with the axis 16A, and since measuring operations are performed by a probe 25 (FIGS. 1,3) also mounted on the spindle 16, it is necessary to relate table movements for such operations to the axis 16A which thus becomes a fixed or machine datum. The table datum surfaces T are therefore used only for an initial setting up operation for the fixture 15 say, at the beginning of a production run. But the counters 21 would normally remain zeroed on the surfaces T for all subsequent operations. In order to relate the axis 24A to the axis 16A the arrangement must be such that when the counters 21 show the workpiece to be at the datum position, the axes 16A, 24A should coincide. This does not necessarily occur in practice and may, for example, be due to thermal contraction or expansion of the table between the time when the fixture was originally mounted and a later time in the production run. Therefore the axis 24A may have a nominal datum position at which it coincides with the axis 16A and an actual datum position in which the axis 24A is offset from the axis 16. The difference between these two positions is referred to as the "work offset".

The probe 25 comprises a body 26 (FIG. 3) secured to the spindle 16 and a stylus 27 on the body 26 and having a ball end 28. The probe 25 is said to sense a work surface, i.e. a surface of the workpiece, if responsive to engagement between the ball 28 and the work surface, the probe outputs a step signal 138 in an electric circuit 29 (FIGS. 3,9). The signal 138 is connected to act on the counters 21 to transfer the instantaneous content of the counters to respective registers 33X, 33Y, 33Z. Thus the position of the work surface is determined at the instant of the transfer to the registers 33 or, for practical purposes, at the instant of the signal 138.

If the position of a work surface is to be related to the axis 16A, the signal 138 should occur when this surface is intersected by the axis 16A. This is not possible in practice partly because the work-contacting surface of the ball 28 is offset from the axis 16A by the radius of this ball; partly because the centre of the ball 28 may not coincide accurately with the axis 16A; and partly because of slight bending of the stylus prior to actual occurrence of the signal 138. For those reasons the signal 138 occurs when the work surface has a spatial relationship with the probe defined by a distance between the axis 16A and the position of the work surface at the instance of the signal 138. This distance is referred to as the "response characteristic" of the probe or simply as the "probe offset".

It will be clear that for the purpose of measuring any work surface, both the work offset and the probe offset have to be taken into account. It is necessary to check these offsets from time to time, especially whenever a new workpiece is mounted on the fixture.

The machine embodies a computer 100 having a program 200 designed to effect a given sequence of movements of the motors M so as to establish the work and probe offsets. The following is a list of the parameters relevant for the program 200.

Position signals or constants:

| | | |
|---|---|---|
| 101 | = nominal X datum position of axis 24A | (FIGS. 1,2) |
| 102 | = nominal Y datum position of axis 24A | " |
| 103 | = nominal Z datum position of the ball end 28 | " |
| 105 | = zero angular position of the spindle 16 | (FIG. 4) |
| 106 | = 90° angular position of the spindle 16 | (FIGS. 4,6,7) |
| 107 | = 180° angular position of the spindle 16 | (FIG. 4) |
| 108 | = 270° angular position of the spindle 16 | (FIG. 5) |
| 109 | = diameter of datum bore. | (FIG. 3) |

These constants are held in the computer store and apply to a given workpiece only. The positions 101, 102, 103 have already been referred to. The positions 105 to 108 are indicated in FIGS. 4 to 7. The position signals are used to drive the motors M through said closed loops.

Drive signals:

| | | |
|---|---|---|
| 111 | = signal to drive motor MX in +X direction | (FIG. 9) |
| 112 | = signal to drive motor MX in −X direction | " |
| 113 | = signal to drive motor MY in +Y direction | " |
| 114 | = signal to drive motor MY in −Y direction | " |
| 118 | = signal to step motor MX | |
| 119 | = signal to step motor MY | |

The drive signals are output by the program 200 to drive the motors M in open loop manner and the motors are stopped on occurrence of the probe signal 138. Driving the motor MX in the +X direction means that the table 11 is moved in the −X direction so that, relatively, the axis 16A moves in the +X direction, and so on.

External signals:

| | | |
|---|---|---|
| 121 | = position feedback from sensor 20I | (FIG. 9) |
| 122 | = position feedback from sensor 20X | " |
| 123 | = position feedback from sensor 20Y | " |
| 124 | = position feedback from sensor 20Z | " |
| 132 | = position feedback from register 33X | " |
| 133 | = position feedback from register 33Y | " |

-continued

| | |
|---|---|
| 138 | = probe signal. |

The external signals are read by the computer as required by the program 200.

Variables:

AX1 = the X-position, as indicated by the relevant counter 21, of the axis 16A when the probe 25 contacts surface portion −DX of the bore 24 and the spindle 16 has the angular position 108, i.e. has the 270° position (FIG. 5)

AX2 = the X-position of the axis 16A when the probe 25 contacts surface portion +DX of the bore 24 and the spindle 16 has the angular position 106, i.e. has the 90° position (FIG. 6).

BX = the X-position of the axis 16A when the probe contacts the face −DX and the spindle 16 has the position 106, i.e. has the 90° position (FIG. 7).

CXN = nominal position of the axis 16A in the X-direction which in the present example, equals the distance 101 (FIG. 4).

CXA = actual position of the axis 16A in the X-direction.

WOX = work offset in the X-direction (FIG. 4).

POX1 = probe offset for measuring in the +X direction, e.g. at the surface portion +DX (FIG. 6).

POX2 = probe offset for measuring in the −X direction, i.e. at the surface −DX (FIG. 7).

F = diameter of datum bore 22 which in the example equals the value 109 (FIG. 3).

Apart from the datum bore variable F, the above variables all relate to the X direction. There are corresponding variables AY1, AY2, BY, CYN, CYA, WOY, POY1 and POY2 for the Y direction, and in the latter case the variable AY1 is determined at a −DY surface in the 180° position of the spindle 16 while the variable BY is determined at the zero angle position of the spindle.

The program 200 will now be described with reference to steps 201 to 240 shown in the flow diagram of FIG. 10. It is assumed that the workpiece is initially in some arbitrary position clear of the probe 25 and that the spindle 16 is at the zero angle position.

Referring to steps 201 to 210, the program outputs the signals 101, 102, 103 to the relevant registers 23 to move the workpiece into the nominal datum position (FIG. 4). After checking that that position has been attained (step 202), the program outputs the signal 108 to the register 23I to rotate the spindle 16 to the 270° position. After checking that the latter position has been attained (step 204), the program outputs the signal 112 to drive the motor MX in the −X direction (step 205), i.e. to move the surface portion −DX toward the probe ball 28 (FIG. 5). By step 206 the program monitors for the occurrence of the probe signal 138, and when that signal occurs (step 207) the signal 118 is output to stop the motor MX (step 208). Thereafter the position of the workpiece at the instant of the signal 138 is read by reading the signal 132 from the register 33X (step 209). Finally, in this section of the program, the variable AX1 is set to the value of the signal 132 (step 210). Steps 211 to 220 repeat the routine of steps 201 to 210 except in that the workpiece is at first moved to the nominal datum position (step 211) to facilitate rotation of the spindle 16, and the latter is rotated through 180° to the 90° position (step 213). Thereafter the workpiece is moved to bring the surface +DX into engagement with the probe (FIG. 6) and the position of axis 16A on occurrence of the probe signal 138 is determined (step 219) and is stored (step 220) as the variable BX.

Steps 221 to 227 repeat the routine except in that the surface −DX is moved into engagement with the probe (step 221) without any rotation of the spindle, i.e. the latter remains at 90°, and the position of the axis 16A on occurreance of the signal 138 is stored (step 227) as the variable BX.

In steps 231 to 238 the variables AX1, AX2, BX and F (the latter derived from the constant 109) are processed to produce the work offset WOX (step 233) and the two probe offsets POX1 and POX2. Two probe offsets are required because the response characteristic of the probe is not normally the same for both surfaces −DX and +DX.

It will be clear that since the two probe offsets are not normally the same, the rotation of the spindle through 180° (step 213) is essential for finding the work offset WOX (step 233) because the latter requires the exact centre between the surfaces −DX and +DX to be determined. The rotation through 180° ensures that the same probe offset is applied at the opposite surfaces −DX, +DX so that the expression (AX1+AX2)/2 (step 232) defines the exact centre therebetween. However, for determining the respective probe offsets the spindle must not be rotated so that opposite sides of the ball 28 engage the opposite surfaces −DX, +DX.

In the remainder of the program (not illustrated) the workpiece is returned to the nominal datum position, and steps corresponding to steps 201-238 are performed to determine the work offset and the two probe offsets in respect of the Y-direction.

It will be noted that the movement of the spindle axis in the X-direction is in practice such that the ball end 28 does not move along the X-direction diameter of the bore but moves on a path spaced therefrom. This can introduce errors due to the distance betweeen the position AX1 and BX on the one hand and the position AX2 on the other hand being less than what it would be if the ball end were to lie on a diameter. This difficulty is overcome as follows. After the two probe offsets POX1 and POX2 have been determined, the computer is used to determine the position, denoted SOX, of the spindle axis at which the mean of the two probe offsets POX1 and POX2 lies on the Y-axis of the bore (FIG. 8). This is done by operation $$SOX = (AX2 + BX)/2$$

The spindle axis is then moved to the position SOX=-(AX2+BX)/2 and the work and probe offsets WOY and POY1, POY2 are determined in the Y-direction. In these circumstances it is preferable to determine the probe offsets first by performing the operations $$POY1 = (F - (AY2 - AY1)/2$$

and $$POY2 = AY2 + POY1 - F - BY$$

without changing the angular position of the spindle. To measure WOY the spindle is rotated through 90° in the sense that the point of the ball end which touches the bore is the same as the point which touched the bore when the spindle was at positions AX1 and AX2. WOY is then determined in the same way as WOX was determined.

Finally, the spindle axis is positioned at SOY=-(AY2+BY)/2 and the program for determining POX1 and POX2 is repeated to give the accuracy which is attainable by carrying out the relevant movement along the X-diameter of the bore.

After the values WOX, POX1, POX2, WOY, POY1, POY2, SOX and SOY have been determined as described, the machine is ready for measuring operations for determining the dimensions or positions on the work piece in the X and Y directions. In any such measurement, the relevant values of the probe offsets are added to or subtracted from, as the case may require, the position which the spindle has at the instant of the probe signal.

The angular position which is used during the latter measuring operations is that occupied by the spindle when at 270°. This angular position is then held constant for all these measuring operations.

The probe 25 may be constructed as described in FIGS. 1 to 3 of United Kingdom Pat. No. 1,445,977.

I claim:

1. The method of operating a machine tool of the kind comprising a tool spindle having an axis of rotation, means for rotating the spindle through predetermined angles of rotation, a table movable relative to the spindle transversely to said axis, a surface-sensing probe mounted on the spindle, means for generating a probe signal at the instant of said probe being brought into a sensing relationship with a surface defined on said table, means responsive to the occurrence of a said probe signal for producing an output corresponding to the position of said axis relative to a primary datum which is fixed in relation to the table, and a computer connected to read said output; the method comprising:

(a) providing on the table a first and a second test surface having therebetween a mid-point defining a secondary datum, said mid-point having an actual position (CA) which may differ from a demanded position (CN), stored in the computer, by an error (WO);

(b) operating the machine to bring the probe into sensing relationship with the first test surface and produce a first corresponding said output (A1);

(c) operating the machine to rotate the spindle through 180°;

(d) operating the machine to bring the probe into sensing relationship with the second test surface and produce a second said corresponding output (A2);

(e) operating the machine to again bring the probe into sensing relationship with the first test surface, without having rotated said spindle after step (d) above and produce a third said corresponding output (B); and (f) operating the computer to read said outputs and determine the following values:

$$WO = CN - (A1 + A2)/2$$

$$PO1 = (F - (A2 - A1)/2,$$

and $$PO2 = A2 + PO1 - F - B$$

wherein
WO=said error,

PO1 = the distance between said spindle axis and the second test surface at the instant of said first output, PO2 = the distance between said spindle axis and the first test surface at the instant of said second output, F = the known distance between the first and second test surfaces, and the position A2 is further from said primary datum than the position A1 and B.

* * * * *